(12) United States Patent
Kagami et al.

(10) Patent No.: US 8,663,856 B2
(45) Date of Patent: Mar. 4, 2014

(54) FUEL CELL STACK

(75) Inventors: Fumio Kagami, Yokohama (JP); Motoharu Obika, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 675 days.

(21) Appl. No.: 12/866,964

(22) PCT Filed: Mar. 20, 2009

(86) PCT No.: PCT/IB2009/000568
§ 371 (c)(1),
(2), (4) Date: Sep. 22, 2010

(87) PCT Pub. No.: WO2009/138829
PCT Pub. Date: Nov. 19, 2009

(65) Prior Publication Data
US 2011/0008690 A1    Jan. 13, 2011

(30) Foreign Application Priority Data

Mar. 25, 2008 (JP) .................................. 2008-077757
Dec. 5, 2008 (JP) .................................. 2008-310622

(51) Int. Cl.
*H01M 8/06* (2006.01)
*H01M 8/24* (2006.01)

(52) U.S. Cl.
USPC .......................................... 429/414; 429/458

(58) Field of Classification Search
USPC ......................................................... 429/458
See application file for complete search history.

(56) References Cited

U.S. PATENT DOCUMENTS

2004/0229100 A1* 11/2004 Komura et al. .................. 429/32
2010/0003560 A1* 1/2010 Shibata ............................ 429/22

FOREIGN PATENT DOCUMENTS

| EP | 1 020 942 A1 | 7/2000 |
| JP | 11-354142 | 12/1999 |
| JP | 2004-111118 | 4/2004 |
| JP | 2004-134130 | 4/2004 |
| JP | 2006-12466 | 1/2006 |
| JP | 2006-147309 | 6/2006 |
| JP | 2006-179233 | 7/2006 |
| JP | 2006-236612 | 9/2006 |
| JP | 2006-260787 | 9/2006 |
| JP | 2007-48484 | 2/2007 |
| JP | 2007-294340 | 11/2007 |
| WO | WO 2008/017935 A2 | 2/2008 |

* cited by examiner

*Primary Examiner* — John S Maples
(74) *Attorney, Agent, or Firm* — Drinker Biddle & Reath LLP

(57) ABSTRACT

A fuel cell stack is provided having a plurality of unit cells stacked in a horizontal direction. Each unit cell includes an electrolyte membrane having two surfaces and a peripheral edge, electrodes provided on both surfaces of the electrolyte membrane, frame-shaped members provided on both surfaces of the electrolyte membrane adjacent to the respective electrodes and adjacent the peripheral edge of the electrolyte membrane, separators provided on the electrodes and the frame-shaped members and having a reactant gas passage for supplying a reactant gas to each of the electrodes, and a manifold formed in the stacking direction in fluid communication with the reactant gas passage. The manifold includes a horizontal edge portion in fluid communication with the reactant gas passage.

12 Claims, 12 Drawing Sheets

PRIOR ART

FUEL CELL STACK

CROSS-REFERENCE TO RELATED APPLICATIONS

This application claims priority to Japanese Patent Application No. 2008-077757 filed Mar. 25, 2008, and Japanese Application No. 2008-310622 filed Dec. 5, 2008, each of which is incorporated by reference herein in its entirety.

BACKGROUND OF THE INVENTION

1. Field of the Invention

The present invention relates to a fuel cell stack.

2. Description of the Related Art

In a conventional fuel cell stack, fuel cells are stacked in a horizontal direction, and a cathode gas inlet manifold is disposed in an upper portion of one of the ends of the fuel cell stack. Also, a buffer portion is provided on a cathode separator which is a component of a fuel cell stack so that the width of a passage increases from the cathode gas inlet manifold to a gas passage. In addition, a cathode gas outlet manifold is disposed in a lower portion of the other end of the fuel cell stack. Further, a buffer portion is provided on the cathode separator so that the width of the passage increases from the gas passage to the cathode gas outlet manifold.

As a result, a cathode gas smoothly flows from the cathode gas inlet manifold to the cathode gas outlet manifold. See, for example, Japanese Unexamined Patent Application Publication No. 2006-236612. However, the above-mentioned conventional fuel cell stack has a problem in that when condensed water is produced in the fuel cell stack after power generation is stopped, the condensed water collects in the gas passage of the separator, potentially blocking gas flow from the cathode into the cathode gas outlet manifold. This problem is particularly significant when the fuel cell stack is operating in ambient temperatures below the freezing point of water, such that the condensed water collected in the gas passage of the separator can freeze.

SUMMARY OF THE INVENTION

The present invention has been achieved in consideration of the problem of conventional fuel cell stacks, and it is an object of the present invention to suppress the condensed water produced in a fuel cell stack from collecting in a gas passage of a separator after power generation is stopped.

In one embodiment of the invention, a fuel cell stack is provided having a plurality of unit cells stacked in a horizontal direction. Each unit cell includes an electrolyte membrane having two surfaces and a peripheral edge, electrodes disposed on both surfaces of the electrolyte membrane, frame-shaped members disposed on both surfaces of the electrolyte membrane adjacent to the respective electrodes and adjacent to the peripheral edge of the electrolyte membrane, separators disposed on the electrodes and the frame-shaped members and having a reactant gas passage for supplying a reactant gas to each of the electrodes, and a manifold formed in the horizontal stacking direction in fluid communication with the reactant gas passage. The manifold comprises a horizontal edge portion in fluid communication with the reactant gas passage.

In another embodiment of the invention, a fuel cell stack is provided having a plurality of unit cells stacked in a horizontal direction. Each units cell includes an electrolyte membrane, electrodes disposed on both surfaces of the electrolyte membrane so that a peripheral portion of the electrolyte membrane is exposed, frame-shaped members disposed on both surfaces of the electrolyte membrane so as to be disposed on the peripheral portion thereof, and separators disposed on the electrodes and the frame-shaped members and each containing a reactant gas passage in which a reactant gas to be supplied to each of the electrodes flows. A manifold is provided in the stacking direction of the unit cells to communicate with the reactant gas passage so that at least a portion of liquid water produced by power generation of the unit cells flows into the manifold. The manifold has a peripheral portion communicating with the reactant gas passage such that the direction of surface tension exerted on the liquid water is substantially opposite to the direction of gravitational force exerted on the liquid water to enable the gravitational force to overcome the surface tension so that the liquid water can flow into the manifold.

In another embodiment of the invention, a fuel cell stack is provided having a plurality of unit cells stacked in a horizontal direction. Each of the unit cell includes an electrolyte membrane having two surfaces and a peripheral edge, electrodes disposed on both surfaces of the electrolyte membrane, frame-shaped members disposed on both surfaces of the electrolyte membrane adjacent to the respective electrodes and adjacent to the peripheral edge of the electrolyte membrane, separators disposed on the electrodes and the frame-shaped members and having a reactant gas passage for supplying a reactant gas to each of the electrodes, and a manifold formed in the horizontal stacking direction in fluid communication with the reactant gas passage. The manifold includes means for facilitating drainage of liquid water from the reactant gas passage.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
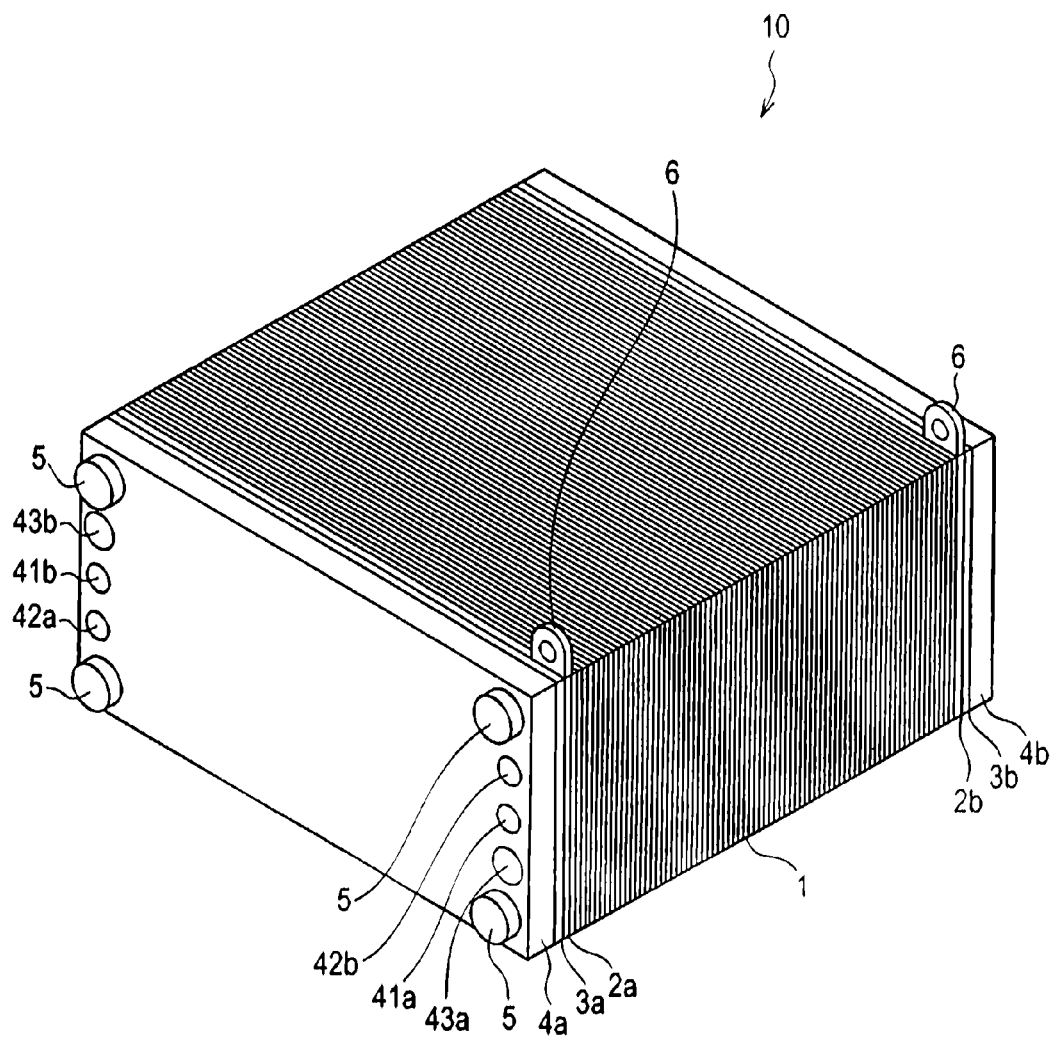
FIG. 1 is a perspective view of a fuel cell stack according to an embodiment of the present invention.

Embodiments of the present invention are described below with reference to the drawings.

First Embodiment

A fuel cell (unit cell) 1 includes an electrolyte membrane 12 sandwiched between an anode electrode 13a (fuel electrode) and a cathode electrode 13b (oxidizer electrode) so that an anode gas (fuel gas) containing hydrogen and a cathode gas (oxidizer gas) containing oxygen are supplied to the anode electrode and the cathode electrode, respectively, to generate electricity. An electrode reaction proceeding on each of the anode electrode 13a and the cathode electrode 13b is as follows:

Anode electrode: $2H_2 \rightarrow 4H^+ + 4e^-$  (1)

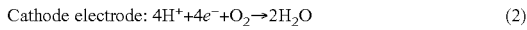

Cathode electrode: $4H^+ + 4e^- + O_2 \rightarrow 2H_2O$  (2)

A fuel cell produces an electromotive force of about 1 volt according to the electrode reactions (1) and (2).

When the fuel cell 1 is used as a power source for automobiles, a fuel cell stack 10 is used in which a plurality of the fuel cells 1, often as many as several hundreds, are stacked, because a large amount electric power is required. Therefore, a fuel cell system for supplying an anode gas and a cathode gas to the fuel cell stack 10 is formed to extract electric power for driving a vehicle.

FIG. 1 is a perspective view of a fuel cell stack 10 used as such a fuel cell system for moving vehicles such as an automobile and the like. The fuel cell stack 10 includes a plurality of unit cells 1 stacked in the horizontal direction, a pair of collecting plates 2a and 2b, a pair of insulating plates 3a and 3b, a pair of end plates 4a and 4b, and nuts 5 screwed onto four tension rods (not shown) for holding the components of the fuel cell stack 10 together.

The unit cell 1 is a unit cell of a solid polymer-type fuel cell which produces electromotive force. The unit cell 1 produces an electromotive voltage of about 1 volt. The detailed configuration of the unit cell 1 will be described later.

The pair of collecting plates 2a and 2b are disposed on the outsides of the stack of the plurality of unit cells 1. The collecting plates 2a and 2b are composed of a gas-impermeable conductive material, for example, dense carbon. Each of the collecting plates 2a and 2b has an output terminal 6 provided at the upper end. In the fuel cell stack 10, electrons e⁻ produced in the unit cells 1 are extracted and output through the output terminals 6.

The pair of insulating plates 3a and 3b are disposed on the outsides of the respective collecting plates 2a and 2b. Each of the insulating plates 3a and 3b is composed of an insulating material, for example, rubber.

The pair of end plates 4a and 4b are disposed on the outsides of the respective insulating plates 3a and 3b. Each of the end plates 4a and 4b is composed of a metallic material with rigidity, for example, steel.

In the end plate 4a of the pair of end plates 4a and 4b, a cooling water inlet manifold 41a and a cooling water outlet manifold 41b, an anode gas inlet manifold 42a and an anode gas outlet manifold 42b, and a cathode gas inlet manifold 43a and a cathode gas outlet manifold 43b, are formed. Each of the manifolds is extended to the inside of the fuel cell stack 10 in the stacking direction of the unit cells 1. In addition, the cathode gas inlet manifold 43a and the cathode gas outlet manifold 43b are larger than the anode gas inlet manifold 42a and the anode gas outlet manifold 42b. This is because the amount (volumetric flow rate) of the cathode gas used is larger than that of the anode gas used during power generation of the fuel cells.

The cooling water inlet manifold 41a, the anode gas outlet manifold 42b, and the cathode gas inlet manifold 43a are formed at an end (as shown on the right side in the drawing) of the end plate 4a. The cooling water outlet manifold 41b, the anode gas inlet manifold 42a, and the cathode gas outlet manifold 43b are formed at the other end (as shown on the left side in the drawing) of the end plate 4a.

When hydrogen gas is supplied to the anode gas inlet manifold 42a as the fuel gas, the hydrogen gas can be supplied directly from a hydrogen storage device or from a hydrogen-containing gas which is produced by reforming hydrogen-containing fuel. Examples of the hydrogen storage device include a high-pressure tank, a liquefied hydrogen tank, a hydrogen storage alloy tank, and the like. Examples of the hydrogen-containing fuels include natural gas, methanol, gasoline, and the like. In addition, air is generally used as the oxidizer gas to be supplied to the cathode gas inlet manifold 43a.

The nuts 5 are screwed onto external threads formed at both ends of the four tension rods (not shown) which are passed through the fuel cell stack 10. The fuel cell stack 10 is tightened in the stacking direction by fastening the nuts 5 to the tension rods. The tension rods are composed of a metallic material with rigidity, for example, steel. The surfaces of the tension rods are subjected to insulating treatment for preventing electric short-circuiting between the unit cells.

Figure 2:
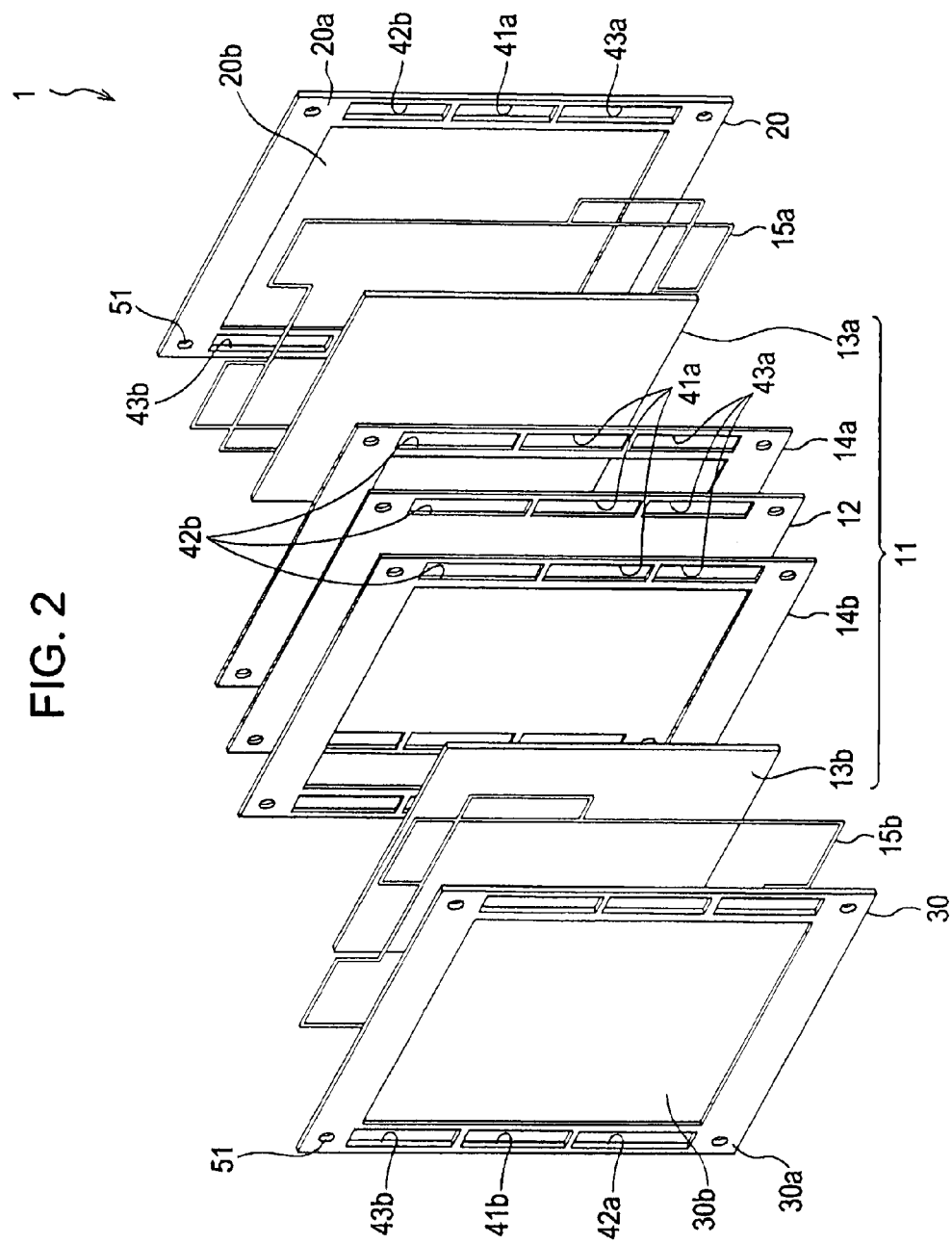
FIG. 2 is an exploded perspective view of a unit cell of a fuel cell stack.
Figure 3:
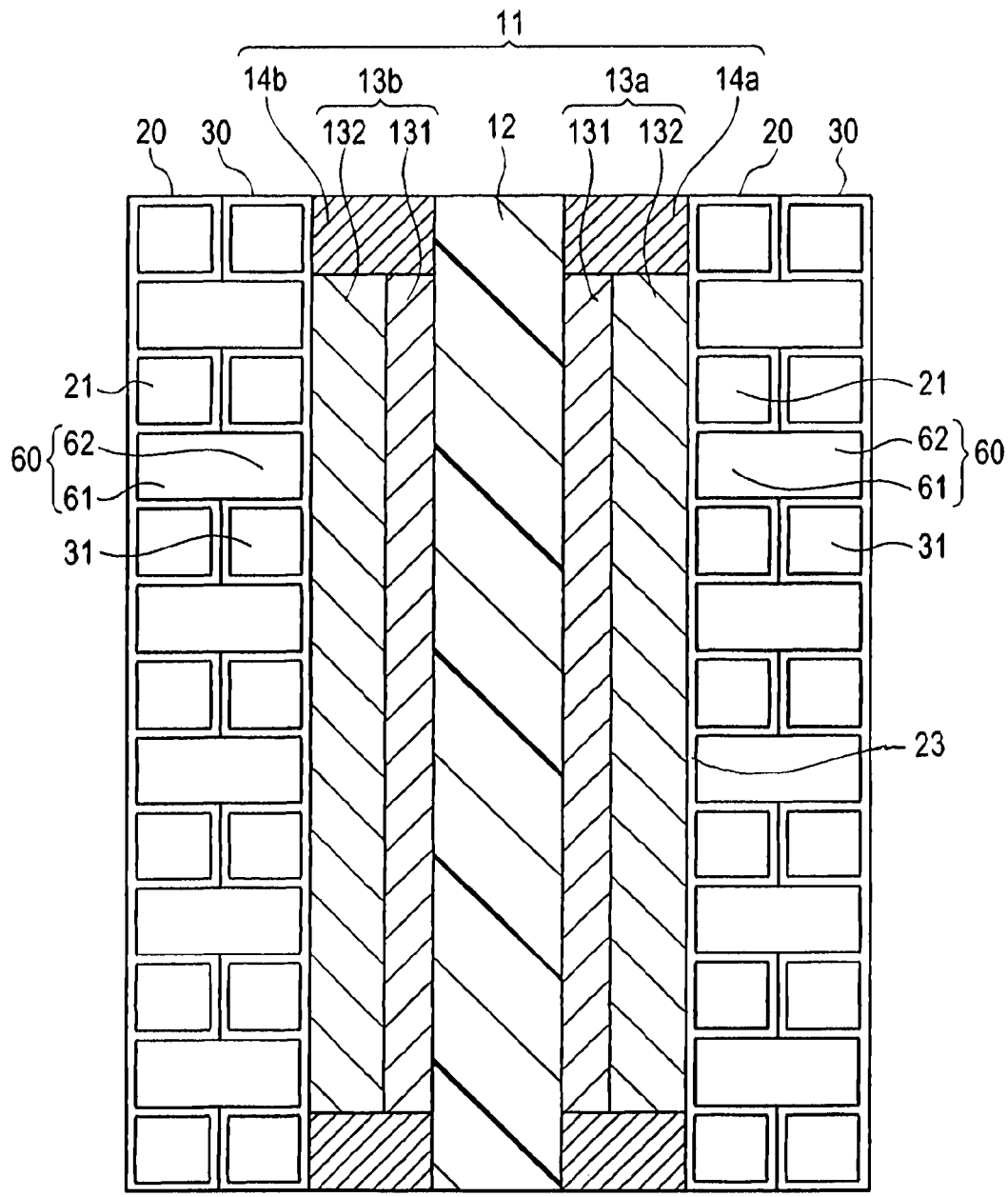
FIG. 3 is a sectional view of a unit cell of a fuel cell stack.

The detailed configuration of the unit cell 1 is described below with reference to FIGS. 2 and 3. FIG. 2 is an exploded perspective view of the unit cell 1, and FIG. 3 is a sectional view of the unit cell 1.

The unit cell 1 includes a membrane electrode assembly (MEA) 11, and an anode separator 20 and a cathode separator 30 which are disposed on opposite surfaces of the MEA 11. The MEA 11 includes an electrolyte membrane 12, an anode electrode 13a, a cathode electrode 13b, and a pair of frame-shaped members 14a and 14b. The electrolyte membrane 12 is a proton conductive ion-exchange membrane made of a solid polymer material (e.g., a fluorocarbon resin) that has a thickness of less than 0.1 millimeter. The frame-shaped members 14a and 14b have the function to maintain the mechanical strength of the MEA 11 and to support the electrolyte membrane 12. The frame-shaped members 14a and 14b are described below as the reinforcements 14a and 14b. In the MEA 11, the reinforcement 14a and the anode electrode 13a are disposed on one of the sides of the electrolyte membrane 12 and the reinforcement 14b and the cathode electrode 13b are disposed on the other side of the electrolyte membrane 12.

In addition, a cooling water inlet manifold 41a, an anode gas outlet manifold 42b, and a cathode gas inlet manifold 43a are formed at one of the sides of the periphery of the electrolyte membrane 12. Similarly, a cooling water outlet manifold 41b, an anode gas inlet manifold 42a, and a cathode gas outlet manifold 43b are formed at the other side of the periphery of the electrolyte membrane 12. Further, through holes 51 are formed at the four corners of the electrolyte membrane 12 for receiving the tension rods.

The electrolyte membrane 12 exhibits high electric conductivity in a wet state. Therefore, in order to improve the power generation efficiency by utilizing the performance of the electrolyte membrane 12, it is necessary to maintain the electrolyte membrane 12 in an optimum moisture state. In this embodiment, the anode gas and cathode gas introduced into the fuel cell stack 10 are humidified. Further, it is necessary to use pure water to humidify the anode gas and cathode gas for maintaining the optimum moisture condition of the electrolyte membrane 12. This is because when water contaminated with impurities is introduced into the fuel cell stack 10, the impurities accumulate on the electrolyte membrane 12, thereby decreasing the power generation efficiency.

The anode electrode 13a and the cathode electrode 13b are disposed on opposite surfaces of the electrolyte membrane 12 (i.e., the anode electrode 13a on one side and the cathode electrode 13b on the other side) so as to each be in contact with the electrolyte membrane 12. Each of the anode electrode 13a and the cathode electrode 13b includes a catalyst layer 131 and a gas diffusion layer 132. The catalyst layer 131 is formed on the electrolyte membrane side of each the electrodes 13a and 13b. The gas diffusion layer 132 is formed on the separator side of each the electrodes 13a and 13b. The catalyst layer 131 is composed of platinum-carrying carbon black particles. The gas diffusion layer 132 is composed of a member having sufficient gas diffusibility and conductivity, for example, a carbon cloth woven with carbon fiber threads.

The reinforcements (frame-shaped members) 14a and 14b are disposed such that one is on either surface of the electrolyte membrane 12 and adjacent to the peripheral edge of the electrolyte membrane 12. The reinforcement 14a is disposed so as to surround the peripheral edge of the anode electrode 13a and the reinforcement 14b is disposed so as to surround the peripheral edge of the cathode electrode 13b.

In addition, the cooling water inlet manifold 41a, the anode gas outlet manifold 42b, and the cathode gas inlet manifold 43a are formed at one of the sides of each of the reinforcements 14a and 14b. Similarly, the cooling water outlet manifold 41b, the anode gas inlet manifold 42a, and the cathode gas outlet manifold 43b are formed at the other side of each of the reinforcements 14a and 14b. Further, the through holes 51 are formed at the four corners of each of the reinforcements 14a and 14b in order to pass the tension rods.

The anode separator 20 includes an outer frame portion 20a and a passage portion 20b. The outer frame portion 20a is in contact with the reinforcement 14a through a gasket 15a. In addition, the cooling water inlet manifold 41a, the anode gas outlet manifold 42b, and the cathode gas inlet manifold 43a are formed at one of the sides of the outer frame portion 20a. Similarly, the cooling water outlet manifold 41b, the anode gas inlet manifold 42a, and the cathode gas outlet manifold 43b are formed at the other side of the outer frame portion 20a. Further, the through holes 51 are formed at the four corners of the outer frame portion 20a in order to pass the tension rods.

The passage portion 20b is in contact with the anode electrode 13a. As illustrated in FIG. 3, the passage portion 20b has a gas passage 21 provided on the side of the anode separator 20 in contact with the anode electrode 13a in order to supply the anode gas to the anode electrode 13a. The passage portion 20b also has a cooling water passage 61 provided on the side of the separator 20 opposite to the side in contact with the anode electrode 13a so that the cooling water for cooling the fuel cell stack heated during power generation flows through the cooling water passage 61. Details of the passage portion 20 are described below with reference to FIGS. 4A and 4B.

The cathode separator 30 also includes an outer frame portion 30a and a passage portion 30b. The outer frame portion 30a is in contact with the reinforcement 14b through a gasket 15b. In addition, the cooling water inlet manifold 41a, the anode gas outlet manifold 42b, and the cathode gas inlet manifold 43a are formed at one of the sides of the outer frame portion 30a. Similarly, the cooling water outlet manifold 41b, the anode gas inlet manifold 42a, and the cathode gas outlet manifold 43b are formed at the other side of the outer frame portion 30a. Further, the through holes 51 are formed at the four corners of the outer frame portion 30a in order to pass the tension rods.

The passage portion 30b is in contact with the cathode electrode 13b. As illustrated in FIG. 3, the passage portion 30b has a gas passage 31 provided on the side of the cathode separator 30 in contact with the cathode electrode 13b in order to supply the cathode gas to the cathode electrode 13b. The passage portion 30b also has a cooling water passage 62 provided on the side of the cathode separator 30 opposite to the side in contact with the cathode electrode 13b.

The cooling water passages 61 and 62 provided in the adjacent anode separator 20 and cathode separator 30, respectively, are formed opposite to each other to form a cooling water passage 60. Note that because FIG. 3 shows both the anode separator 20 and the cathode separator 30 in the same view, the cooling water passages 61 and 62 appear to be the same passage; however the cooling water passage 61 is provided in the anode separator 20 and the cooling water passage 62 is provided in the cathode separator 30. The anode separator 20 and the cathode separator 30 are made of a material such as a metal or carbon.

When fuel cells 10 are used as a power source for automobiles, several hundreds of unit cells 1 are required to be stacked together because a large amount of electric power is required, and a large amount of water is discharged during power generation because a large quantity of electricity is generated.

The anode gas and cathode gas to be supplied and discharged cannot hold an amount of water which exceeds the saturated water vapor pressure. Therefore, condensation may occur in a fuel cell stack 10 mounted on an automobile depending on the temperature and humidity conditions during power generation, and thus a large amount of liquid water may collect in the gas passages of the separators 20 and 30. Unlike in a stationary fuel cell, in a fuel cell mounted on an automobile, system start is required at any ambient temperature. If liquid water remains in the gas passages, the liquid water may be frozen when the ambient temperature of the fuel cell is a below the freezing temperature of water. Then, when a system start is required under a condition in which liquid water is frozen, gas supply to the anode electrode and the cathode electrode is inhibited, thereby decreasing the power generation performance.

Further, if liquid water remains in the gas passages 21 and 31 of each of unit cells 1 in a fuel cell stack 10, the unit cells 1 subjected to sufficient gas supply may be mixed with unit cells 1 subjected to insufficient gas supply. Therefore, in each of the unit cells 1 subjected to insufficient gas supply, the reactions represented by the above formulae (1) and (2) are inhibited, and thus the voltage becomes negative, resulting in deterioration of those unit cells 1.

In this embodiment, therefore, a notch 100 is provided at a predetermined position of the reinforcement 14a or 14b in order to decrease the liquid water remaining in the gas passages 21 and 31 by enhancing the ability of the liquid water to flow out of the unit cell 1. The shape and features of embodiments of the notch 100 are described below.

Figure 4A:
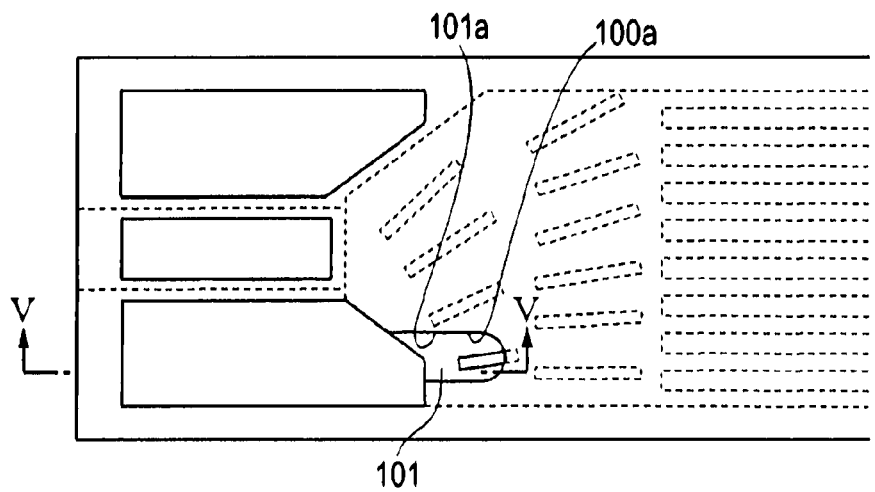
FIGS. 4A and 4B are plan views of an anode separator and a reinforcement according to a first embodiment as viewed from the anode electrode side.
Figure 4B:
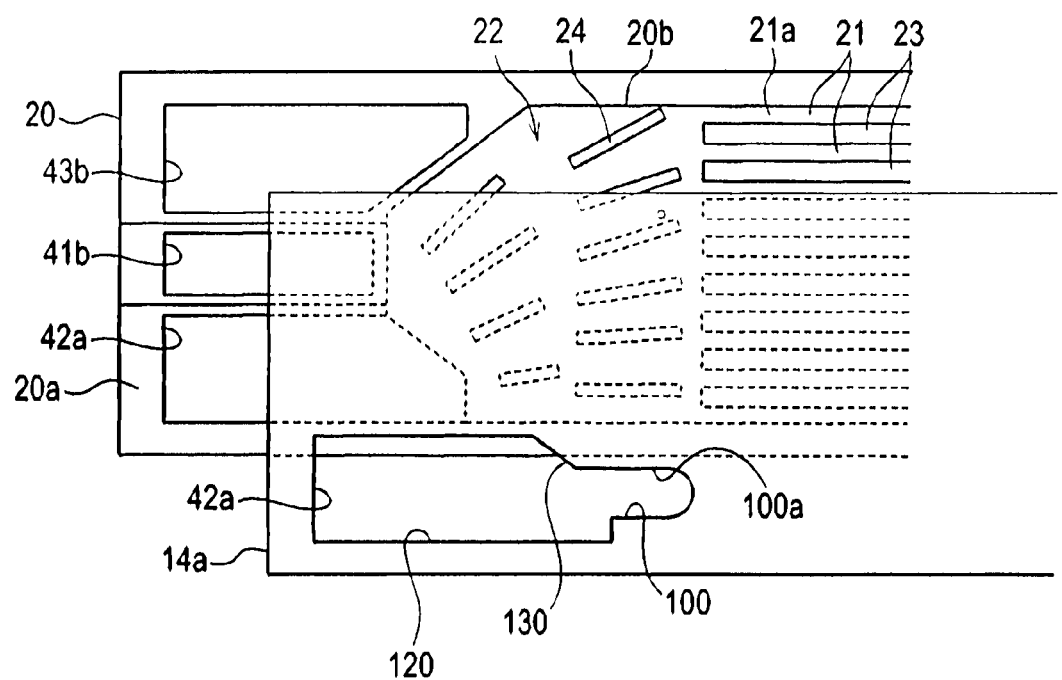

FIGS. 4A and 4B are plan views of the anode separator 20 and the reinforcement 14a as viewed from the anode electrode side. FIG. 4A shows the anode separator 20 and the reinforcement 14a in a stacked state, and FIG. 4B shows the anode separator 20 and the reinforcement 14a in a disassembled state.

The configuration of the anode separator 20 is described. As shown in FIG. 4B, the cathode gas outlet manifold 43b, the cooling water outlet manifold 41b, and the anode gas inlet manifold 42a are formed at an end of the outer frame 20a of the anode separator 20 in that order from above as shown in FIG. 4B. In addition, a plurality of groove-like gas passages 21 and gas diffusion portion 22 are formed in the surface of the reactant gas passage portion 20b. The gas passages 21 are formed between a plurality of ribs 23 which project from the gas passage surface 21a toward the anode electrode side to be in contact with the anode electrode. The cooling water passage 61 (not shown) is formed at the back side of the ribs 23 when a plurality of unit cells is stacked. The gas diffusion portion 22 has a plurality of diffusers 24 for uniformly distributing the anode gas introduced from the anode gas inlet manifold 42a into the gas passages 21.

Next, the position of the notch 100 formed in the reinforcement 14a is described. The notch 100 is formed in the anode gas inlet manifold 42a so as to be positioned on the lower side in the vertical direction when unit cells 1 are stacked to form a fuel cell stack 10. Because the notch 100 is designed to take advantage of gravity in facilitating drainage of liquid water from the gas diffusion portion 22, the vertical direction is understood to be generally in the upward and downward direction with respect to gravity, and the horizontal direction is understood to be generally in the lateral direction perpendicular to the vertical direction and thus perpendicular to the force vector of gravity.

The notch 100 is formed in the opening 120 which forms the anode gas inlet manifold 42a. Further, the notch 100 is formed in a manifold peripheral portion 130 communicating with the gas diffusion portion 22 of the reactant gas passage portion 20b. Also, the notch 100 is formed to overlap the gas diffusion portion 22 of the anode separator 20 as viewed from the stacking direction when the anode separator 20 and the reinforcement 14a are stacked together as shown in FIG. 4A. As a result, when the anode separator 20 and the reinforcement 14a are stacked together, the notch 100 communicates with the anode gas inlet manifold 42a, and a space 101 is formed in a communication portion between the anode gas inlet manifold 42a and the gas diffusion portion 22.

In this embodiment, the notch 100 is formed so that a top surface 101a of the space 101 is substantially perpendicular to the gravitational direction. Consequently, a horizontal portion 100a is formed in the periphery of the notch 100, the top surface 101a being disposed in the horizontal portion 100a of the notch 100.

Figure 5:
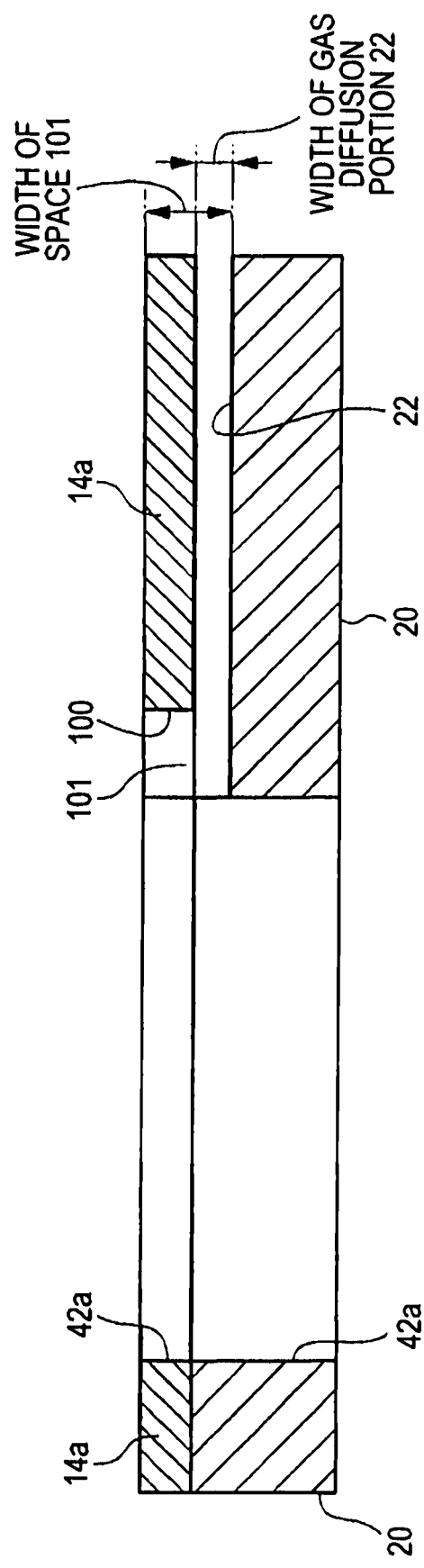
FIG. 5 is a sectional view taken along line V-V in FIG. 4A.

FIG. 5 is a sectional view taken along line V-V in FIG. 4A as viewed from below in the vertical direction. As shown in FIG. 5, when the notch 100 is formed in the anode gas inlet manifold 42a of the reinforcement 14a, the notch 100 communicates with the anode gas inlet manifold 42a and forms the space 101. In a stacked state, the width of the space 101 (height from the bottom of the gas diffusion portion 22 to the anode electrode 13a) is larger than the width of the gas diffusion portion 22 (height from the bottom of the gas diffusion portion 22 to the reinforcement 14a).

Figure 6A:
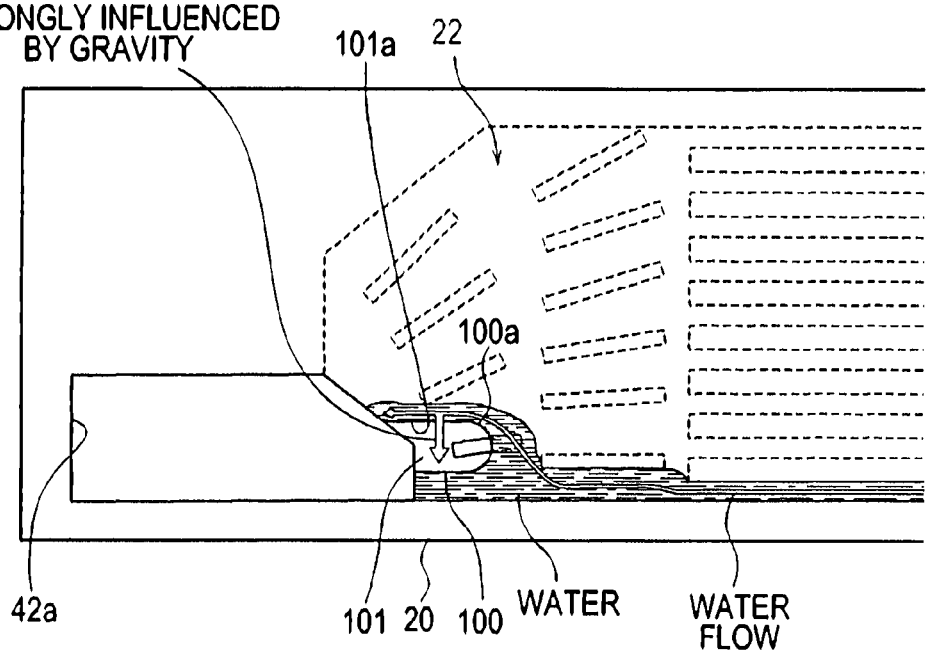
FIGS. 6A and 6B are drawings each illustrating a liquid water flow when a notch is formed.
Figure 6B:
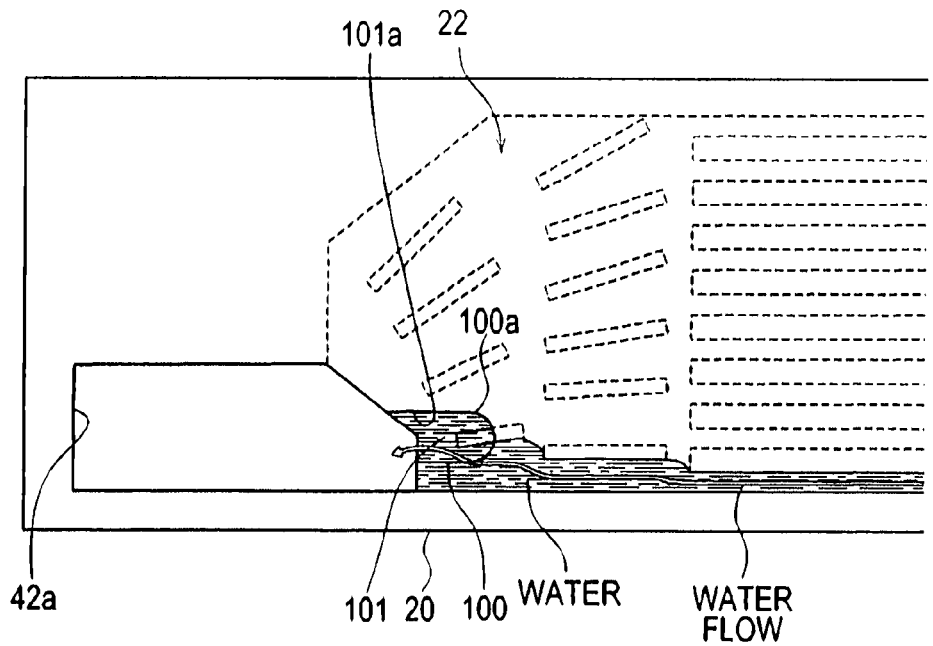
Figure 12:
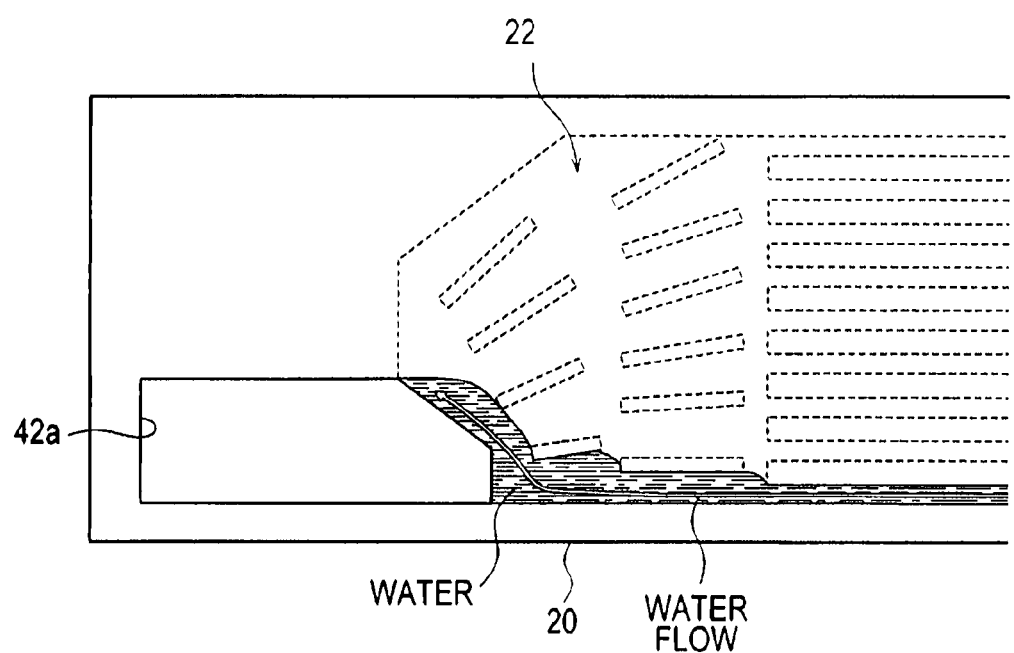
FIG. 12 is a drawing illustrating a liquid water flow when a notch is not formed.

The advantage of the formation of the notch 100 is described below. FIGS. 6A and 6B are drawings illustrating a liquid water flow when the notch 100 is formed. FIG. 12 is a drawing illustrating a liquid water flow when the notch 100 is not formed.

For the sake of easy understanding of the invention, a liquid water flow when the notch 100 is not formed is first described with reference to FIG. 12. As shown in FIG. 12, liquid water produced in the gas passage due to generation reactions gravitationally collects in a lower portion of the gas diffusion portion 22 of the anode separator 20. In this case, the liquid water flowing into the anode gas inlet manifold 42a flows, due to the influence of surface tension, upward along a peripheral portion 130 of the opening 120 of the anode gas inlet manifold 42a without flowing into the anode gas inlet manifold 42a, the peripheral portion 130 being the portion of the opening 120 in contact with the gas diffusion portion 22. When the liquid water is present along the peripheral portion 130 of the anode gas inlet manifold 42a, the liquid water may be frozen due to a decrease in the ambient temperature of the fuel cells. If the liquid water becomes frozen, the flow of the anode gas flowing into the gas diffusion portion 22 from the anode gas inlet manifold 42 may be inhibited.

On the other hand, when the notch 100 is formed as in the present embodiment of the invention, the liquid water flowing into the anode gas inlet manifold 42a behaves as shown in FIG. 6A. First, as in the embodiment of FIG. 12, the liquid water flows toward the anode gas inlet manifold 42a along the vertically lower side of the anode separator 20. Then, the liquid water flows along the peripheral edge of the notch 100.

In this embodiment, the upper surface 101a of the space 101 includes a horizontal portion 100a in the notch 100. Because of the narrowness of the gas diffusion portion 22, surface tension of the water exerts a force around the periphery of the notch 100 to prevent the water from flowing into the manifold 42a. However, when liquid water reaches the horizontal portion 100a, gravity exerted on the liquid water in a direction opposite to the direction of the surface tension overcomes the surface tension and enables the liquid water to flow into the manifold 42a. In other words, the directions of the surface tension and gravity are canceled by each other. That is, by forming the horizontal portion 100a in the upper surface 101a of the notch 100, the gravity is sufficient to overcome the surface tension exerting on the liquid water. When the liquid water reaches the horizontal portion 100a, a the gravitation force from the weight of the water exceeds the surface tension, and thus the liquid water flows into the space 101. Namely, the horizontal portion 100a is formed in the upper surface 101a so that the directions of the surface tension and gravity exerting on the liquid water are substantially opposite to each other and canceled by each other.

After the liquid water flows into the space 101 and its surface tension has been broken, the liquid water is discharged to the anode gas inlet manifold 42a as shown in FIG. 6B. As a result, it is possible to prevent the liquid water from moving along the upper side of the edge of the anode gas inlet manifold 42a and inhibiting gas flow into the gas diffusion portion 22. Therefore, the flow of the reactant gas flowing into the gas diffusion portion 22 from the anode gas inlet manifold 42a is not inhibited by the liquid water.

In the above-described embodiment, the notch 100 is formed in the anode gas inlet manifold 42a of the reinforcement 14a so as to overlap the gas diffusion portion 22 of the anode separator 20 when the anode separator 20 and the reinforcement 14a are stacked together. In addition, the upper surface 101a of the space 101 formed by the notch 100 is formed to be substantially perpendicular to the gravitational direction, thereby providing the horizontal portion 100a at the upper side of the periphery of the notch 100 in the gravitational direction.

Gravity exerts downward force on the liquid water in the vertical direction according to the mass of the liquid water. Therefore, when the liquid water reaches the horizontal portion 100a, gravity exerts downward force on the liquid water in the vertical direction. In this case, the directions of gravity and surface tension exerting on the liquid water are substantially opposite to each other. As a result, the liquid water overcomes the force exerted by surface tension and moves downwardly. Therefore, the liquid water which generally flows along the upper side of the edge of the anode gas inlet manifold 42a of the anode separator 20, due to the influence of surface tension, can instead be allowed to flow into the space 101 from the horizontal portion 101a of the notch 100 due to the influence of gravity. Therefore, the end of the anode gas inlet manifold 42 can be prevented from being clogged with frozen liquid water. Consequently, the flow of the reactant gas flowing into the gas diffusion portion 22 from the anode gas inlet manifold 42a is not inhibited, thereby maintaining sufficient gas supply to the anode electrode 13a.

In this embodiment, an arrangement is described in which the notch 100 is provided in the anode gas inlet manifold 42a of the reinforcement 14a. However, the notch 100 may be of course provided in the cathode gas inlet manifold 43a of the reinforcement 14b. Since the anode gas inlet manifold 42a is smaller than the cathode gas inlet manifold 43a, the anode gas inlet manifold 42a is more likely to be clogged by freezing of residual liquid water. Therefore, in particular, it is most effective to provide the notch 100 in the anode gas inlet manifold 42a.

Second Embodiment

Figure 7A:
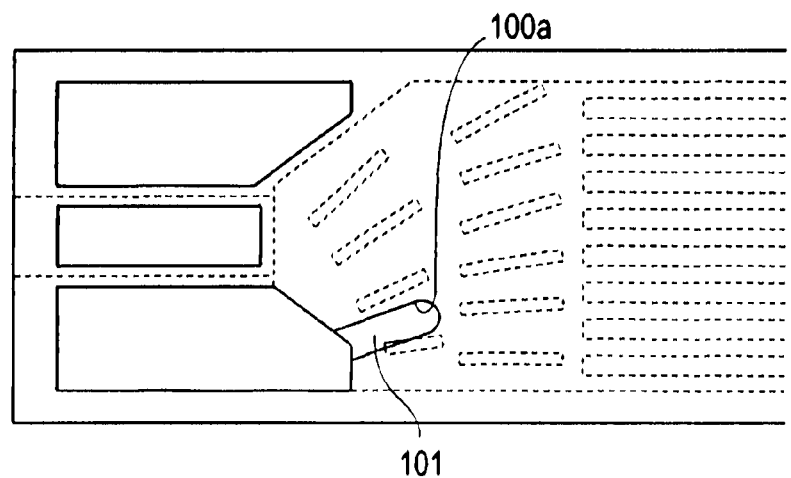
FIGS. 7A and 7B are plan views of an anode separator and a reinforcement according to a second embodiment as viewed from the anode electrode side.
Figure 7B:
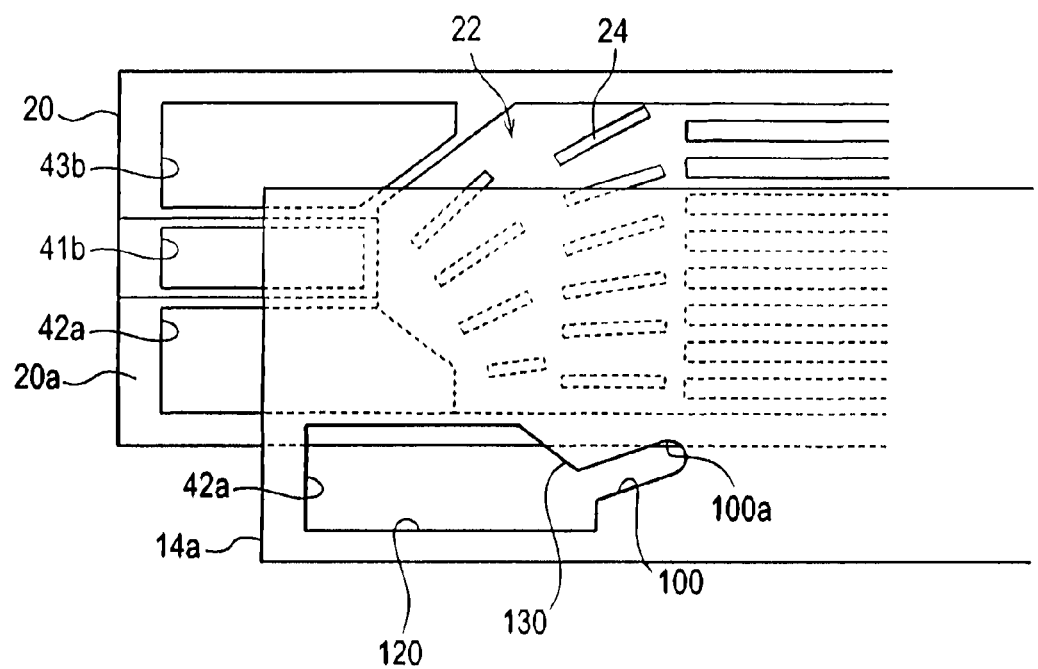

FIGS. 7A and 7B show a second embodiment of the present invention. The second embodiment is different from the first embodiment in that the shape of the notch 100 is changed. The difference is described below; the portions having the same functions as in the first embodiment are denoted by the same reference numerals and appropriately not described below.

FIGS. 7A and 7B are each a plan view of the anode separator 20 and the reinforcement 14a as viewed from the anode electrode side. FIG. 7A shows the anode separator 20 and the reinforcement 14a in a stacked state, and FIG. 7B shows the anode separator 20 and the reinforcement 14a in a disassembled state.

As shown in FIG. 7A, in this embodiment, the notch 100 is formed so as to have minimal or no overlap with diffusers 24 of the gas diffusion portion 22 when the anode separator 20 and the reinforcement 14a are stacked together. Residual liquid water flows between the adjacent diffusers 24. Therefore, when the notch 100 does not overlap the diffusers 24, the liquid water can be more effectively allowed to flow into the space 101 formed by the notch 100.

In this embodiment, the horizontal portion 100a is formed near the top of the notch 100 in the vertical direction. In addition, the notch 100 has a portion inclined to the anode gas inlet manifold 42a from the horizontal portion 100a. According to this embodiment, in addition to the advantage of the first embodiment, the liquid water can be more efficiently allowed to flow into the space 101 because the notch 100 is formed so as not to overlap, or so as to minimally overlap, the diffusers 24. Further, since the notch 100 has the portion inclined to the anode gas inlet manifold 42a, the liquid water more easily moves toward the manifold 42a.

Third Embodiment

Figure 8A:
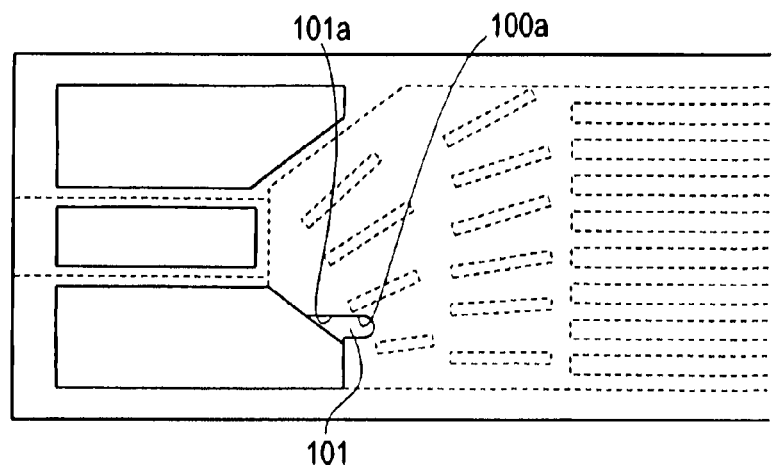
FIGS. 8A and 8B are plan views of an anode separator and a reinforcement according to a third embodiment as viewed from the anode electrode side.
Figure 8B:
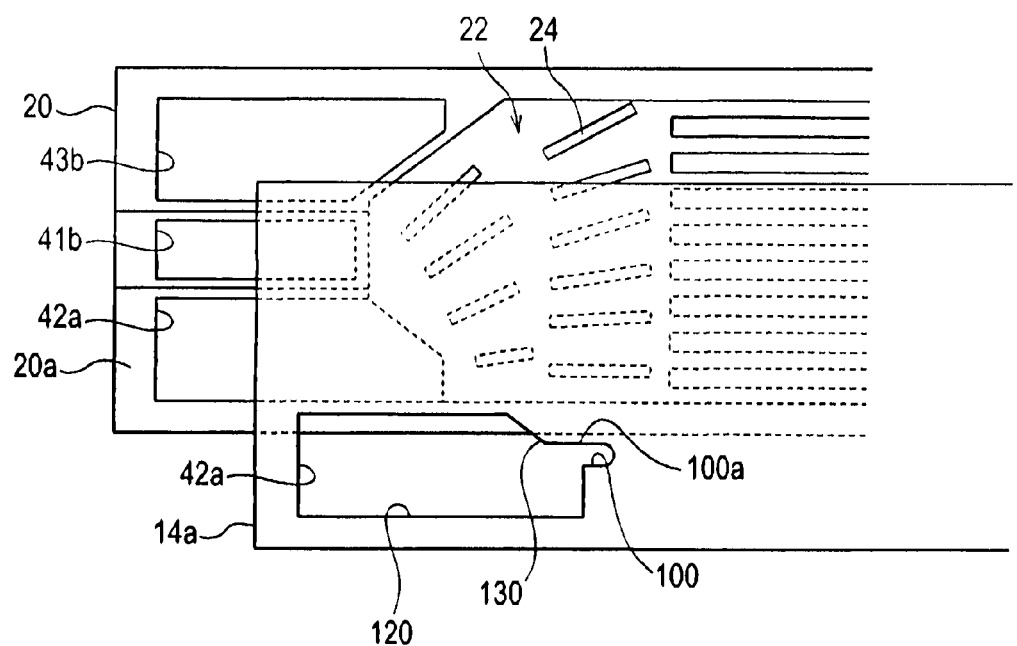

FIGS. 8A and 8B show a third embodiment of the present invention. The third embodiment is different from the first embodiment in that the shape of the notch 100 is changed. The difference is described below.

FIGS. 8A and 8B are each a plan view of the anode separator 20 and the reinforcement 14a as viewed from the anode electrode side. FIG. 8A shows the anode separator 20 and the reinforcement 14a in a stacked state, and FIG. 8B shows the anode separator 20 and the reinforcement 14a in a disassembled state.

As shown in FIG. 8A, in this embodiment, the notch 100 is formed so as not to overlap the diffusers 24 of the gas diffusion portion 22 when the anode separator 20 and the reinforcement 14a are stacked together. Also, the notch 100 is formed to be positioned between the anode gas inlet manifold 42a and the diffusers 24. Like in the first embodiment, the notch 100 has the horizontal portion 100a.

According to this embodiment, in addition to the advantage of the first embodiment, the liquid water can be more efficiently allowed to flow into the space 101 because the notch 100 is formed so as not to overlap the diffusers 24. Further, since the notch 100 is formed to be positioned between the anode gas inlet manifold 42a and the diffusers 24, the notch 100 is smaller than that in the first embodiment. Therefore, the mechanical strength of the MEA 11 can be improved as compared with the first embodiment.

Fourth Embodiment

A fourth embodiment of the present invention is described with reference to FIGS. 9A and 9B. The fourth embodiment is different from the first embodiment in the shape of the notch 100. The difference is described below.

Figure 9A:
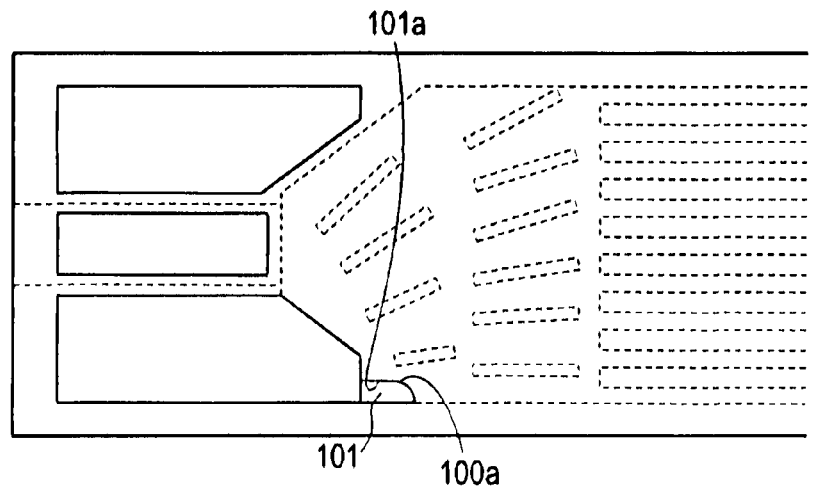
FIGS. 9A and 9B are plan views of an anode separator and a reinforcement according to a fourth embodiment as viewed from the anode electrode side.
Figure 9B:
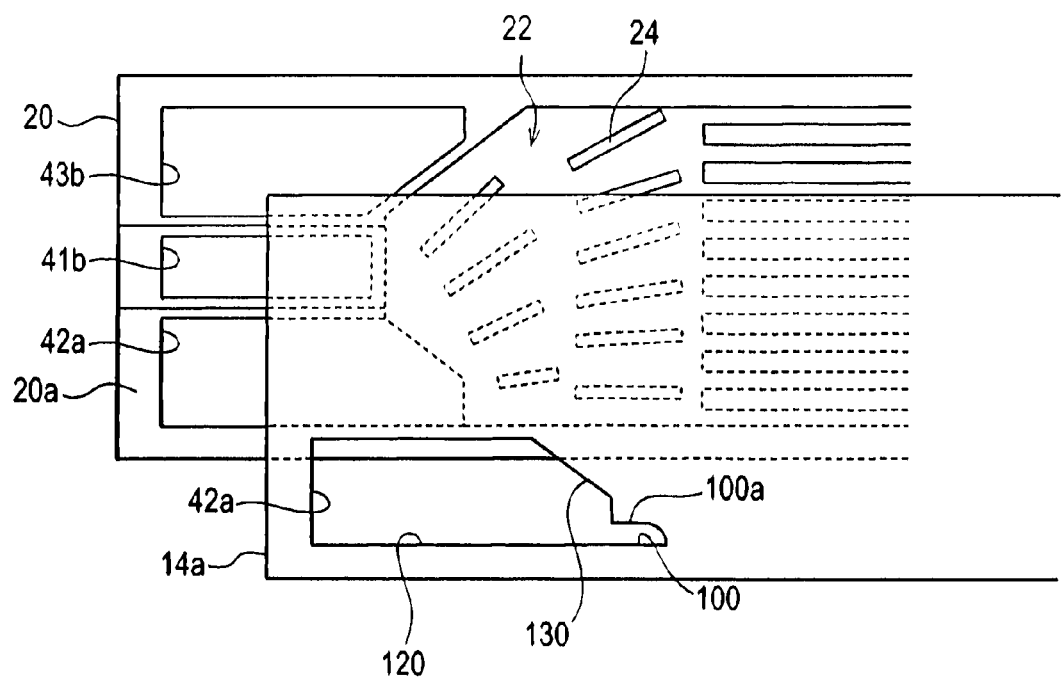

FIGS. 9A and 9B are each a plan view of the anode separator 20 and the reinforcement 14a as viewed from the anode electrode side. FIG. 9A shows the anode separator 20 and the reinforcement 14a in a stacked state, and FIG. 9B shows the anode separator 20 and the reinforcement 14a in a disassembled state.

As described above, liquid water produced in a gas passage 21 by generation reaction gravitationally collects in a lower portion (in the gravitational direction) of the gas diffusion portion 22 of the anode separator 20 and moves toward the anode gas inlet manifold 42a. Therefore, as shown in FIG. 9A, in this embodiment, the notch 100 is formed at the lowest position in the anode gas inlet manifold 42a of the reinforcement 14a. Like in the first embodiment, the notch 100 has the horizontal portion 100a.

According to this embodiment, the notch 100 is formed to be positioned on the lower side of the gas diffusion portion 22 where liquid water collects when the anode separator 20 and the reinforcement 14a are stacked together. Therefore, in addition to the advantage of the first embodiment, the liquid water remaining in the lowest portion of the separator can be more efficiently allowed to flow into the space 101, because there is no need to overcome surface tension for the liquid water remaining in the lowest portion of the separator.

Fifth Embodiment

A fifth embodiment of the present invention is described with reference to FIGS. 10A and 10B. The fifth embodiment is different from the first embodiment in that a notch 100 is formed in the anode gas inlet manifold 42a of the anode separator 20. The difference is described below.

Figure 10A:
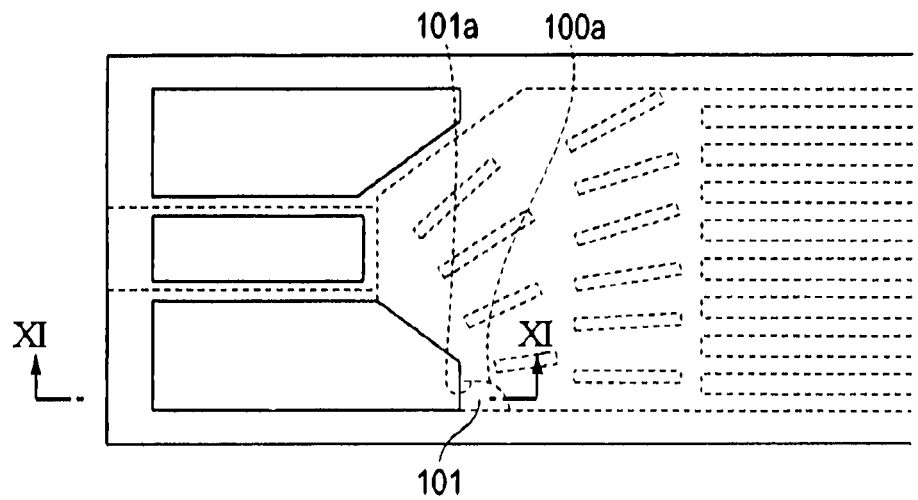
FIGS. 10A and 10B are plan views of an anode separator and a reinforcement according to a fifth embodiment as viewed from the anode electrode side.
Figure 10B:
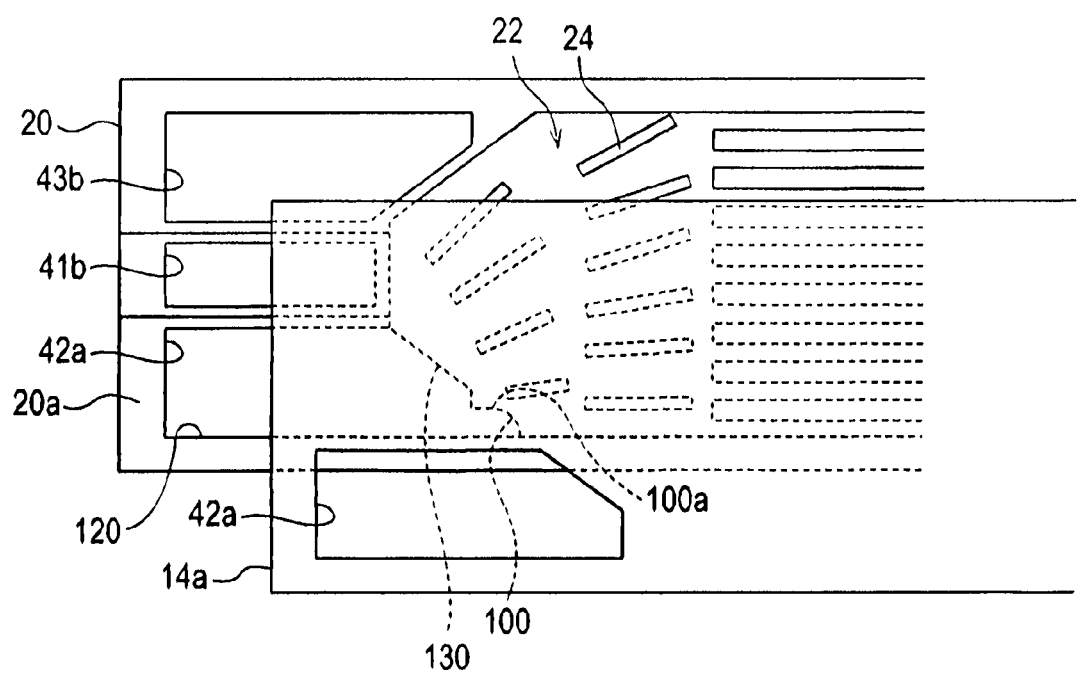

FIGS. 10A and 10B are each a plan view of the anode separator 20 and the reinforcement 14a as viewed from the anode electrode side. FIG. 10A shows the anode separator 20 and the reinforcement 14a in a stacked state, and FIG. 10B shows the anode separator 20 and the reinforcement 14a in a disassembled state.

As shown in FIGS. 10A and 10B, in this embodiment, the notch 100 is formed in the anode gas inlet manifold 42a of the anode separator 20. The notch 100 is formed in the periphery of the anode gas inlet manifold 42a of the anode separator 20 so as to project toward the gas diffusion portion 22.

In addition, the notch 100 is disposed on the lowest side of the gas diffusion portion 20 in the vertical direction. Therefore, a space 101 communicating with both the anode gas inlet manifold 42a and the gas diffusion portion 22 is formed.

Figure 11:
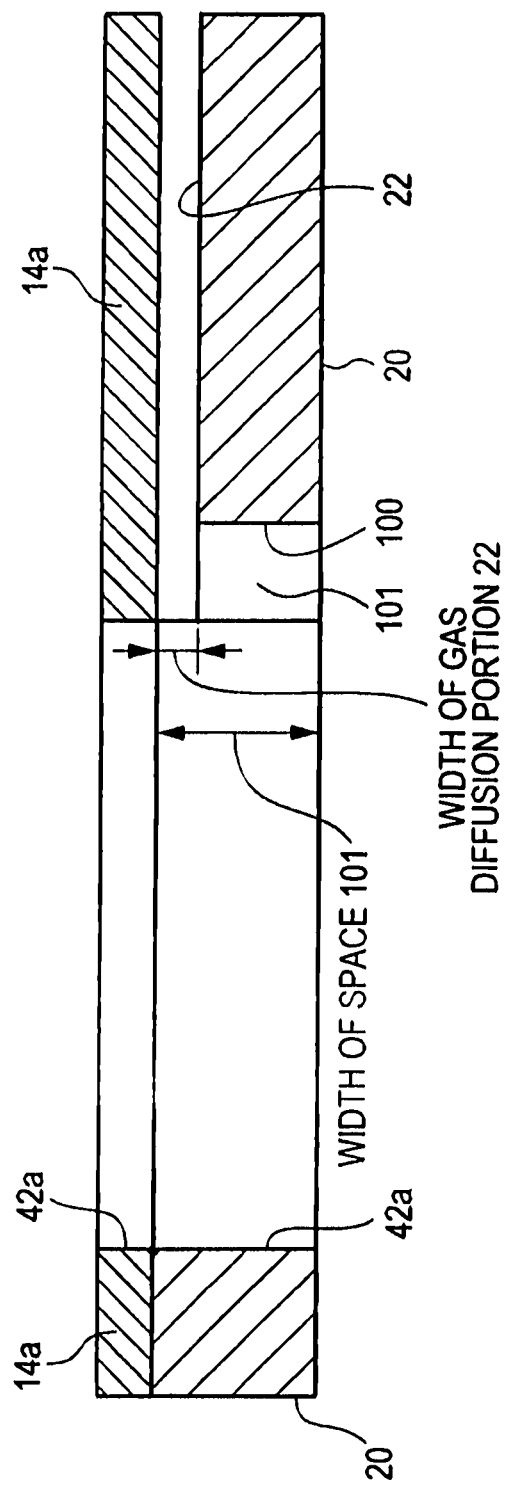
FIG. 11 is a sectional view taken along line XI-XI in FIG. 10A.

FIG. 11 is a drawing showing a section taken along line XI-XI in FIG. 10A as viewed from the lower side in the vertical direction. As shown in FIG. 11, the notch 100 is formed in the periphery of the anode gas inlet manifold 42a of the anode separator 20, and thus the space 101 is wider than the gas diffusion portion 22 as in the first embodiment. Further, the upper surface 101a of the space 101 is formed to be substantially perpendicular to the gravitational direction to form a horizontal portion 100a in the periphery of the notch 100, as shown in FIG. 10.

In this configuration, liquid water reaching the horizontal portion 100a of the notch 100 flows into the space 101 due to its own weight. Therefore, like in the first embodiment, liquid water can be discharged to the anode gas inlet manifold 42a. In the fifth embodiment, the same advantage as the first embodiment can be obtained.

The present invention is not limited to the above-mentioned embodiments and various modifications can be made within the scope of the technical idea of the invention. For example, the notch 100 may be provided in the anode gas outlet manifold 42b or the cathode gas outlet manifold 43b.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell stack comprising:
a plurality of unit cells stacked in a horizontal direction, each of the unit cells including:
an electrolyte membrane having two surfaces and a peripheral edge;
electrodes disposed on both surfaces of the electrolyte membrane;
frame-shaped members disposed on both surfaces of the electrolyte membrane adjacent to the respective electrodes and adjacent to the peripheral edge of the electrolyte membrane;
separators disposed on the electrodes and the frame-shaped members and having a reactant gas passage for supplying a reactant gas to each of the electrodes; and
a manifold formed in the horizontal stacking direction in fluid communication with the reactant gas passage;
wherein the manifold comprises a horizontal edge portion in fluid communication with the reactant gas passage;
wherein the manifold is defined by at least one of the frame-shaped members and includes a notch; and
wherein the horizontal edge portion comprises an upper side of the notch.

2. The fuel cell stack according to claim 1,
wherein the reactant gas passage includes a plurality of groove-like gas passages and a gas diffusion portion formed between the groove-like gas passages and the manifold; and
wherein the notch is disposed at a position overlapping the gas diffusion portion.

3. The fuel cell stack according to claim 1,
wherein the manifold is formed in at least one of the separators.

4. The fuel cell stack according to claim 3,
wherein the reactant gas passage includes a plurality of groove-like gas passages and a gas diffusion portion formed between the groove-like gas passages and the manifold; and
wherein the notch projects toward the gas diffusion portion.

5. The fuel cell stack according to claim 2, wherein the gas diffusion portion includes a plurality of diffusers for diffusing and converging the reactant gas supplied to and exhausted from the manifold, respectively.

6. The fuel cell stack according to claim 5, wherein the notch is disposed between the adjacent diffusers in the horizontal stacking direction.

7. The fuel cell stack according to claim 5, wherein the notch is disposed between the manifold and the diffusers in the horizontal stacking direction.

8. The fuel cell stack according to claim 1, wherein the manifold is provided on the lower side of the fuel cell stack in the vertical direction.

9. The fuel cell stack according to claim 1, wherein the manifold is an anode gas manifold communicating with the reactant gas passage in which an anode gas flows.

10. A fuel cell stack comprising:
a plurality of unit cells stacked in a horizontal direction, each of the units cells including:
an electrolyte membrane;
electrodes disposed on both surfaces of the electrolyte membrane so that a peripheral portion of the electrolyte membrane is exposed;
frame-shaped members disposed on both surfaces of the electrolyte membrane so as to be disposed on the peripheral portion thereof; and
separators disposed on the electrodes and the frame-shaped members and each containing a reactant gas passage in which a reactant gas to be supplied to each of the electrodes flows; and
a manifold provided in the stacking direction of the unit cells to communicate with the reactant gas passage so that at least a portion of liquid water produced by power generation of the unit cells flows into the manifold;
wherein the manifold includes a notch having an upper horizontal edge, the notch communicating with the reactant gas passage such that the direction of surface tension exerted on the liquid water is substantially opposite to the direction of gravitational force exerted on the liquid water to enable the gravitational force to overcome the surface tension so that the liquid water can flow into the manifold.

11. A fuel cell stack comprising:
a plurality of unit cells stacked in a horizontal direction, each of the unit cells including an electrolyte membrane having two surfaces and a peripheral edge, electrodes disposed on both surfaces of the electrolyte membrane, frame-shaped members disposed on both surfaces of the electrolyte membrane adjacent to the respective electrodes and adjacent to the peripheral edge of the electrolyte membrane, separators disposed on the electrodes and the frame-shaped members and having a reactant gas passage for supplying a reactant gas to each of the electrodes, and a manifold formed in the horizontal stacking direction in fluid communication with the reactant gas passage;

wherein the manifold comprises means for facilitating drainage of liquid water from the reactant gas passage, and wherein the means for facilitating drainage comprises a notch disposed in one of the frame-shaped members, the notch defined by a horizontal edge portion at an upper side thereof.

12. A fuel cell stack comprising:

a plurality of unit cells stacked in a horizontal direction, each of the unit cells including an electrolyte membrane having two surfaces and a peripheral edge, electrodes disposed on both surfaces of the electrolyte membrane, frame-shaped members disposed on both surfaces of the electrolyte membrane adjacent to the respective electrodes and adjacent to the peripheral edge of the electrolyte membrane, separators disposed on the electrodes and the frame-shaped members and having a reactant gas passage for supplying a reactant gas to each of the electrodes, and a manifold formed in the horizontal stacking direction in fluid communication with the reactant gas passage;

wherein the manifold comprises means for facilitating drainage of liquid water from the reactant gas passage, and wherein the means for facilitating drainage comprises a notch disposed in one of the separators, the notch defined by a horizontal edge portion at an upper side thereof.

* * * * *